United States Patent [19]

Kita et al.

[11] Patent Number: 4,500,678

[45] Date of Patent: Feb. 19, 1985

[54] LUBRICANT COMPRISING A PARTIALLY DEFLUORINATED GRAPHITE FLUORIDE

[75] Inventors: Yasushi Kita; Shirou Moroi; Akira Sakanoue; Hisaji Nakano, all of Ube, Japan

[73] Assignee: Central Glass Co., Ltd., Yamaguchiken, Japan

[21] Appl. No.: 514,792

[22] Filed: Jul. 18, 1983

[30] Foreign Application Priority Data

Jul. 19, 1982 [JP] Japan ................... 57-125370

[51] Int. Cl.³ .................... C10M 7/04; C10M 1/10
[52] U.S. Cl. .................... 252/58; 252/29
[58] Field of Search .................... 252/29, 58

[56] References Cited

U.S. PATENT DOCUMENTS

| | | | |
|---|---|---|---|
| 3,607,747 | 9/1971 | Ishikawa et al. | 252/58 |
| 4,036,718 | 7/1977 | Brown et al. | 252/58 |
| 4,201,777 | 5/1980 | Inoue | 252/29 |
| 4,435,839 | 3/1984 | Gu et al. | 252/29 |

OTHER PUBLICATIONS

N. Watanabe and K. Ueno, Effect of Ultraviolet Ray on Graphite Fluoride in Organic Solvents, Bull. Chem. Soc. Jpn, 53, (1980), 388–390.

*Primary Examiner*—Jacqueline V. Howard
*Attorney, Agent, or Firm*—Armstrong, Nikaido, Marmelstein & Kubovcik

[57] ABSTRACT

A lubricant comprising a partially defluorinated graphite fluoride obtained by exposing a dispersion of raw material graphite fluoride to electromagnetic radiation, followed by the separation of the resulting partially degraded graphite fluoride. The partially defluorinated graphite fluoride is not only excellent in lubricating properties but also has excellent compatibilities with resins, greases and oils. The excellent compatibilities of the partially defluorinated graphite fluoride are effective in preventing the unfavorable deposition of the graphite fluoride in a liquid lubricant composition and advantageously lead to improvement in the moldability of any graphite fluoride-resin composition, thereby enabling the ultimate composition to exhibit excellent lubricating properties.

14 Claims, No Drawings

LUBRICANT COMPRISING A PARTIALLY DEFLUORINATED GRAPHITE FLUORIDE

This invention relates to a lubricant comprising a partially defluorinated graphite fluoride. More particularly, this invention is concerned with a lubricant comprising a partially defluorinated graphite fluoride obtained by a process which comprises dispersing a graphite fluoride in a dispersion medium and exposing the resulting dispersion to electromagnetic radiation to effect partial degradation of the graphite fluoride.

Graphite fluorides are solid, powdery substances and they have a low surface free energy, a low coefficient of friction and a long wear life over wide ranges of temperature, pressure and load. Further, graphite fluorides are thermally stable and have a strong resistance to chemicals. Because of these peculiar properties, the graphite fluorides are highly appreciated in a wide variety of industrial fields for usages thereof, for example, as active materials in electrochemical cells, lubricants, anti-wetting agents, stain-resistant agents and water- and oil-repellent materials. Especially, in the field of lubricants, it is known that graphite fluorides are superior solid lubricants under high temperatures, in oxidizing atmospheres, under heavy loads, etc. The various tests show that graphite fluorides generally provide adequate lubrication under conditions where graphite and molybdenum disulfide are totally unsatisfactory. It is, therefore, anticipated that the application of graphite fluorides will be increasing more and more.

One of the conventionally known graphite fluorides is poly-monocarbon monofluoride of the formula $(CF)_n$. It is well known that this compound is very useful as a solid lubricant [see, for example, J. Chem. Soc. Dalton pp 1268–1273 (1974)]. $(CF)_n$ can be produced by reacting an amorphous carbon material, such as petroleum coke, with fluorine at a temperature of about 200° C. to about 450° C. or by reacting a crystalline carbon material, such as natural and artificial graphites, with fluorine at a temperature of about 500° C. to about 630° C.

Another of the conventionally known graphite fluorides is poly-dicarbon monofluoride of the formula $(C_2F)_n$. $(C_2F)_n$ was found by Watanabe et al. $(C_2F)_n$ can be produced in relatively high yield, and hence can be provided at comparatively low cost. The novel graphite fluoride $(C_2F)_n$ can be obtained, as described in detail in U.S. Pat. No. Re. 30,667, by heating a graphite material at a temperature of 300° to 500° C. in an atmosphere of fluorine gas under 100 to 760 mmHg. As the graphite material to be used for the production of $(C_2F)_n$, there can be mentioned a natural graphite, an artificial graphite, a kish graphite, a pyrolytic graphite and mixtures thereof. The resulting $(C_2F)_n$ has a crystalline structure in which a layer structure is stacked with an interlayer spacing of about 9.0 Å (whereas the crystalline structure of $(CF)_n$ has an interlayer spacing of about 6 Å) to form a packing structure, and in each layer, each alternate carbon atom is bonded to one fluorine atom, as different from $(CF)_n$ in which each carbon atom is bonded to one fluorine atom. Each of $(CF)_n$ and $(C_2F)_n$, however, has $CF_2$ and $CF_3$ groups as the peripheral groups at the terminals of the carbon hexagonal network layer of the product. Therefore, when fluorination of a graphite has been completed, the F/C molar ratios of the resulting $(C_2F)_n$ and $(CF)_n$ exceed 0.5 and 1.0, respectively. The excess amount of fluorine due to the peripheral $CF_2$ and $CF_3$ groups increases as the crystallite size along the a,b-axis of the graphite fluoride crystal becomes small [see J. Amer. Chem. Soc., 101, 3832, (1979)].

As is apparent from the foregoing, according to the reaction conditions and the kind or crystallinity of the carbon material employed, there is obtained $(CF)_n$, $(C_2F)_n$ or a mixture thereof, occasionally together with a carbon material remaining unreacted which is present in the product when fluorination of the carbon material is stopped before no weight increase of the product is observed.

As is apparent from the foregoing, also, the composition of the graphite fluoride to be formed by the fluorination of a carbon material varies depending on the reaction temperature and the kind or crystallinity of the raw carbon material. $(CF)_n$ may be produced by reacting an amorphous carbon material, such as petroleum coke, with fluorine at a temperature of about 200° C. to about 450° C., and $(CF)_n$ or a $(CF)_n$-rich mixture of $(CF)_n$ and $(C_2F)_n$ may be produced by reacting a crystalline carbon material, such as natural and artificial graphites, with fluorine at a temperature of about 500° C. to about 630° C. The reason for conducting the fluorination reaction below 630° C. is that the decomposition of $(CF)_n$ is promoted over 630° C. and that there is no available material for the reaction vessel which can withstand fluorine corrosion at such high temperatures. Compounds of the formula $(CF)_n$ are produced with varied crystallinities and those having high crystallinities are white solids. On the other hand, $(C_2F)_n$ or $(C_2F)_n$-rich mixtures of $(C_2F)_n$ and $(CF)_n$ may be produced by reacting a crystalline carbon material, such as natural and artificial graphites, with fluorine at a temperature of about 300° C. to about 500° C. The color of $(C_2F)_n$ is black under the conditions for the formation thereof and changes from black through grey to white with heat treatment thereof at an elevated temperature of up to about 600° C. with increase of crystallinity. When a natural graphite is used as a raw material, the resulting graphite fluoride product is $(CF)_n$ or a $(CF)_n$-rich mixture of $(CF)_n$ and $(C_2F)_n$ in the event that the fluorination is conducted at a temperature higher than about 500° C., whereas it is $(C_2F)_n$ or a $(C_2F)_n$-rich mixture of $(C_2F)_n$ and $(CF)_n$ in the event that the fluorination is conducted at a temperature up to about 500° C. The higher the temperature, the more the $(CF)_n$ content of the product, whereas the lower the temperature the more the $(C_2F)_n$ content of the product. The same also applies, with respect to an artificial graphite material except that the boundary temperature is not about 500° C. but about 470° C.

The reaction time is not critical. If complete fluorination of a carbon material is intended, the fluorination reaction may be continued until weight increase of the graphite fluoride product is no longer recognized. As mentioned above, according to the reaction conditions and the kind or crystallinity of the carbon material employed, there is obtained $(CF)_n$, $(C_2F)_n$ or a mixture thereof, occasionally together with a carbon material remaining unreacted which is present in the product when fluorination of the carbon material is stopped before no weight increase of the product is observed. Hence, the graphite fluorides are occasionally represented by the formula $(CF_x)_n$ in which x is a number greater than 0 but less than 1.3.

As aforementioned, the graphite fluorides are highly appreciated in a wide variety of industrial fields due to their peculiar properties. The low surface free energy of the graphite fluorides which is one of their peculiar properties may, however, be disadvantageous in some cases, primarily because the low surface free energy naturally leads to strong water—and oil—repellence characteristics and, hence, to poor compatibility with materials to be mixed with the graphite fluoride to prepare a graphite fluoride composition having superior lubricating properties. Illustratively stated, when a graphite fluoride is added to a plastic material to improve the lubricating properties of the plastic material so that stronger resistance to wear is attained, the poor compatibility between the graphite fluoride and the plastic material causes the moldability of the resulting mixture to decrease and also causes the shaped article obtained from the mixture to have a poor mechanical strength. Further, when a graphite fluoride is mixed with a commonly-known lubricating oil to prepare a liquid lubricant, the poor compatibility between the graphite fluoride and the lubricating oil causes the dispersibility of the graphite fluoride in the oil to decrease, thereby causing the unfavorable deposition of the graphite fluoride in the liquid lubricant. Therefore, there is a continuous demand in the art for a lubricant comprising a graphite fluoride, which is free from the above-mentioned drawbacks and exhibits excellent lubricating properties.

Intensive researches have been conducted to modify the graphite fluoride so that the above-mentioned drawbacks can be obviated. As a result, it has unexpectedly been found that a graphite fluoride having improved lubricating properties can be obtained simply by a process comprising dispersing a graphite fluoride in a dispersion medium and exposing the resulting dispersion to electromagnetic radiation to effect partial degradation of the graphite fluoride in the dispersion, and that the thus partially degraded graphite fluoride is excellent in the compatibility with a plastic, lubricating oil and other materials and, therefore, enables the ultimate composition to have excellent lubricating properties, as compared with the graphite fluoride that has not been subjected to the above-noted process. Based on these novel findings, we have completed this invention.

It is, therefore, an object of this invention to provide a lubricant comprising a graphite fluoride, which is not only excellent in lubricating properties but also has an improved compatibility with a plastic, lubricating oil and other materials and, therefore, enables the ultimate composition to have excellent lubricating properties, as compared with the conventional graphite fluoride. The foregoing and other objects, features and advantages of the present invention will be apparent to those skilled in the art from the following detailed description and appended claims.

According to the present invention, there is provided a lubricant comprising a partially defluorinated graphite fluoride obtained by a process comprising dispersing a graphite fluoride in a dispersion medium to obtain a dispersion, exposing the dispersion to electromagnetic radiation to effect partial degradation of the graphite fluoride in the dispersion so that the fluorine atoms in the graphite fluoride are partially removed, and separating the resulting partially degraded graphite fluoride from the dispersion.

In the preparation of the partially defluorinated graphite fluoride according to the present invention, the raw material graphite fluoride is dispersed in a dispersion medium, preferably under agitation, before exposure to electromagnetic radiation.

As the suitable raw material graphite fluoride, there can be mentioned $(CF)_n$, $(C_2F)_n$ and mixtures thereof. Further, $(CF)_n$, $(C_2F)_n$ or a mixture thereof together with a carbon material remaining unreacted can also be suitably employed in the present invention.

The particle diameter of the raw material graphite fluoride to be employed in the present invention is not critical. However, generally, a graphite fluoride having a particle diameter of from 0.01 to 100 microns is preferred.

In the preparation of the partially defluorinated graphite fluoride of the present invention, the exposure of the dispersion to electromagnetic radiation is usually conducted to such an extent that the graphite fluoride exhibits a degree of degradation of from 0.01 to 50%. The degree of degradation as used herein is defined by $$\frac{X_1 - X_2}{X_1} \times 100 \, (\%)$$

in which $X_1$ represents the amount of fluorine atoms contained in the graphite fluoride before the exposure and $X_2$ represents the amount of fluorine atoms contained in the graphite fluoride after the exposure. The method for measuring the amount of fluorine atoms is described later. When the degree of degradation of the graphite fluoride is less than 0.01%, the improvement of the graphite fluoride by exposure to electromagnetic radiation is insufficient. When the degree of degradation of the graphite fluoride exceeds 50%, it takes a disadvantageously prolonged period of time to attain the intended degradation.

Further, the graphite fluoride having a high degree of degradation of more than 50% comes to exhibit poor lubricating properties. It is more preferred that the exposure of the dispersion to electromagnetic radiation be conducted to such an extent that the graphite fluoride exhibits a degree of degradation of from 0.1 to 10%.

The wavelength of the electromagnetic radiation to be employed in the preparation of the partially defluorinated graphite fluoride is not critical, if it is within the range of wavelength of what is generally called "electromagnetic radiation", approximately, from $10^{-17}$ to $10^5$ m. From the viewpoint of the efficient degradation of the graphite fluoride, however, an electromagnetic radiation having a wavelength smaller than $10^{-4}$ cm is preferred. On the other hand, from the viewpoint of the effect on the human health, an electromagnetic radiation having a wavelength larger than $10^{-7}$ cm is preferred. Therefore, the preferred electromagnetic radiations to be employed in the present invention are visible lights, ultraviolet rays and X-rays which have a wavelength of from $10^{-4}$ to $10^{-7}$ cm. The intensity of the electromagnetic radiation and the time of exposure to the electromagnetic radiation are not critical, if they are sufficient to attain the above-mentioned degree of degradation. The greater the intensity of the radiation, the shorter the time of exposure to the electromagnetic radiation. The intensity of the radiation and the time of exposure to the electromagnetic radiation may be varied according to need.

The partially defluorinated graphite fluoride having a predetermined degree of degradation in terms of a value of $$\frac{X_1 - X_2}{X_1} \times 100 \, (\%)$$

in which $X_1$ and $X_2$ are as defined above can be obtained by stopping the exposure to electromagnetic radiation at an appropriate stage which is known by referring to the previously obtained relationship between the exposure conditions, such as intensity of the electromagnetic radiation, time of exposure and kind of the dispersion medium and the resulting degree of degradation. To obtain, previously, the relationship between the exposure conditions and the resulting degree of degradation, an aliquot of the dispersion may be taken out at a varied stage of the exposure, filtered, washed with the solvent employed as the dispersion medium or employed to prepare the dispersion medium and dried under vacuum at a temperature of from 50° to 70° C. Then, the relulting sample is subjected to the measurement of fluorine content as described later. From the fluorine content, the degree of degradation as defined above can be calculated at that stage of the exposure. In a manner as described above, there is readily obtained the relationship between the exposure conditions and the resulting degree of degradation.

The dispersion medium in which the raw material graphite fluoride is dispersed in the present invention is not critical, and any of those which are capable of wetting the graphite fluoride is suitably employed. As the suitable dispersion medium, there can be mentioned an organic solvent, such as ethanol, hexane and acetone, and a water containing a surface active agent, such as polyoxyethylene alkyl esters and sorbitan fatty acid esters. Further, as the suitable dispersion medium, there can be mentioned an aqueous solution of alkali, such as potassium hydroxide and sodium hydroxide. The aqueous alkaline solution may be preferred because it generally increases the rate of degradation of the graphite fluoride. It is preferred that the aqueous alkaline solution to be employed as the dispersion medium in the present invention contain from 0.1 to 30 parts by weight of alkali per 100 parts by weight of the solution. Still further, as the suitable dispersion medium, there can be mentioned an alkaline gas, such as ammonia gas.

When the dispersion of graphite fluoride is exposed to electromagnetic radiation in the preparation of the partially defluorinated graphite fluoride according to the present invention, the degradation of the graphite fluoride first takes place on the surface portion of each graphite fluoride particle and then proceeds efficiently into the internal portion of the particle up to an extent that the degree of degradation is about 50%. The phenomenon of the degradation occurring due to the electromagnetic radiation in the present invention has not yet been completely elucidated. What has been elucidated to date is as follows. By that degradation, the fluorine atoms are partially removed from the graphite fluoride while none of the carbon atoms are removed. The fluorine atoms removed from the graphite fluoride in an aqueous medium are recognized as $F^-$ anions, whereas those removed in an alcohol medium are recognized as HF, causing part of the alcohol to be oxidized to an aldehyde or ketone. Incidentally, the pyrolysis of a graphite fluoride cannot attain the same effect as attained by the partial degradation of the graphite fluoride according to the present invention.

After the exposure to electromagnetic radiation to effect partial degradation of the graphite fluoride in the dispersion so that the fluorine atoms in the graphite fluoride are partially removed, the resulting partially degraded graphite fluoride may be separated from the dispersion according to the customary procedures generally employed for separation of a solid from a liquid, such as filtration, centrifugation or the like.

As in the case of the conventional graphite or molybdenum disulfide ($MoS_2$), the thus obtained partially defluorinated graphite fluoride as such may be used as a solid lubricant or it may be compounded with a resin, oil, grease and/or other material to prepare a lubricant in a composition form. As compared with the conventional lubricants, the partially defluorinated graphite fluoride is not only excellent in lubricating properties but also has excellent compatibilities with resins such as phenolic resins, polyimides, polyamides, polyethylene, polymethyl methacrylate and fluoropolymers; petroleum oils such as paraffinic oils and naphthenic oils; non-petroleum oils such as silicone oils and fluoro-oils; and greases such as mineral oil greases and silicone greases. The excellent compatibilities of the partially defluorinated graphite fluoride are effective in preventing the unfavorable deposition of the graphite fluoride in a liquid lubricant composition as mentioned above. Further, the excellent compatibilities advantageously lead to improvement in the moldability of any graphite fluoride-resin composition and, therefore, enable the ultimate composition to exhibit excellent lubricating properties.

In view of the above-described advantages, the novel lubricant comprising the partially defluorinated graphite fluoride according to the present invention is commercially valuable.

The present invention will now be described in more detail with reference to the following Examples that by no means limit the scope of the invention.

In the following Examples, the fluorine content of the graphite fluoride and the lubricating properties, i.e. friction coefficient with respect to the graphite fluoride and specific wear rate with respect to the resin composition comprising the graphite fluoride, were determined according to the following methods.

1. Fluorine Content of Graphite Fluoride 100 mg of a graphite fluoride sample was weighed out, and homogeneously mixed with a melting agent consisting of 2.5 g of potassium carbonate and 2.5 g of sodium carbonate in a platinum crucible. The crucible was placed in an electric furnace, and heated at 700°–750° C. to obtain a melt. The crucible was taken out and cooled to room temperature. The melt was dissolved in a predetermined amount of distilled water to obtain an aqueous solution. A predetermined amount of aliquot was pipetted out from the solution, and the pH of the aliquot was adjusted to 3.4. Titration by means of an auto-photometric titrator was conducted with a standard solution of thorium nitrate using a solution of Alizarin Red S as the indicator.

2. Friction Coefficient of Graphite Fluoride

An aliquot of the powdery graphite fluoride to be tested was applied, using a deerskin, onto the outer surface of a cylinder having an inside diameter of 10 mm and an outside diameter of 20 mm which was made of a carbon steel for machinery architecture of grade S45C according to the Japanese Industrial Standards. The resulting test specimen was mounted on the EFM-III EN abrasion tester (trade name of an abrasion tester manufactured and sold by Toyo Baldwin Co, Ltd., Japan) and the friction coefficient of the graphite fluoride was measured under a load of 5.0 kg.

3. Specific Wear Rate of Composition Comprising Phenolic Resin and Graphite Fluoride 85 Parts by weight of Nationallite CN-3611 (trade name of a phenolic resin manufactured and sold by Matsushita Electric Works, Ltd., Japan) and 15 parts by weight of the graphite fluoride to be tested were blended by means of a ribbon mixer to obtain a powdery mixture. The powdery mixture was further blended for an hour while heating at a temperature elevation rate of 2° C./min. The resulting mixture was passed twice through a roll mill heated at 130° C., cooled to room temperature and crushed with a crusher into granules having a diameter of less than 1 mm. A portion of the granules were put in a die heated at 110° C., and heated to 190° C. while applying a pressure of 200 Kg/cm$^2$, followed by cooling to room temperature to obtain a cylindrical specimen having an inside diameter of 10 mm and an outside diameter of 20 mm. The thus obtained cylindrical specimen was subjected to the measurement of specific wear rate, against the high carbon chromium steel of grade SUJ 2 according to the Japanese Industrial Standards, by means of the above-mentioned abrasion tester in which a load of 3.1 Kg was employed and the length of travel was 500 m. The specific wear rate (W) is defined by the following formula:

$$W (mm^3/km \cdot kg) = \frac{V}{L \times P}$$

in which V represents the measured abrasion loss (mm$^3$), L represents the length of travel (km) and P represents the load (kg).

EXAMPLE 1

A photochemical reaction apparatus (UVL-400HA manufactured and sold by Rikoh Kagaku Sangyo K.K., Japan) equipped with a 400 W high-pressure mercury lamp (wavelengths of the radiations emitted: 3126–3132 Å, 3650–3663 Å, 4047–4058 Å, 5461 Å, and 5770–5791 Å) was employed.

1.0 Liter of cyclohexane as the dispersion medium and 100 g of a graphite fluoride (fluorine content 62.69% by weight, F/C ratio 1.06, average particle diameter 14 μm) consisting essentially of (CF)n as the raw material were charged in the above-mentioned apparatus, and, while agitating and cooling, exposed to the radiation from the mercury lamp for 3 hours. After the exposure, the graphite fluorine was filtered off, washed with distilled cyclohexane and dried. The fluorine content of the resulting graphite fluoride as measured according to the above-described method was 62.23% by weight. The degree of degradation and F/C ratio calculated from the measured fluorine content were 0.73% and 1.04, respectively.

The partially defluorinated graphite fluoride, and the untreated graphite fluoride each were subjected to the above-described measurements of friction coefficient and specific wear rate. The results are shown in Table 1 and Table 2.

As is apparent from Table 1 and Table 2, the resulting partially defluorinated graphite fluoride is excellent in lubricating properties as compared with the untreated graphite fluoride.

EXAMPLE 2

Substantially the same procedures as described in Example 1 were repeated except that the exposure to radiation was conducted for 24 hours.

The measured fluorine content of the resulting graphite fluoride was 61.12% by weight. The degree of degradation and F/C ratio calculated from the measured fluorine content were 2.5% and 0.99, respectively. The partially defluorinated graphite fluoride was subjected to the above-described measurements of friction coefficient and specific wear rate. The results are shown in Table 1 and Table 2. As is apparent from Table 1 and Table 2, the thus obtained graphite fluoride is excellent in lubricating properties as compared with the untreated graphite fluoride.

EXAMPLE 3

Outdoors under a fair sky, 1.0 liter of a dispersion medium made by adding 5% by weight of potassium hydroxide to 50% by volume of ethanol and 50% by volume of water and 100 g of a graphite fluoride (fluorine content 51.55% by weight, F/C ratio 0.67, average particle diameter 20 μm) consisting essentially of (C$_2$F)n were put in a glass flask and exposed to the sunlight for 3 hours while stirring. After the exposure to the sunlight, the graphite fluoride was filtered off and dried. The measured fluorine content of the resulting graphite fluoride was 51.33% by weight. The degree of degradation and F/C ratio calculated from the measured fluorine content were 0.43% and 0.67, respectively.

The thus obtained partially defluorinated graphite fluoride and the untreated graphite fluoride each were subjected to the above-mentioned measurements of friction coefficient and specific wear rate.

The results are shown in Table 1 and Table 2.

As is apparent from Table 1 and Table 2, the resulting partially defluorinated graphite fluoride is excellent in lubricating properties as compared with the untreated graphite fluoride.

TABLE 1

Friction Coefficient of Graphite Fluoride

| | Graphite Fluoride | Friction Coefficient |
|---|---|---|
| Example 1 | partially defluorinated (CF)n | 0.08 |
| Example 2 | partially defluorinated (CF)n | 0.09 |
| Control | raw material (CF)n for Examples 1 & 2 | 0.13 |
| Example 3 | partially defluorinated (C$_2$F)n | 0.06 |
| Control | raw material (C$_2$F)n for Example 3 | 0.08 |

TABLE 2

Specific Wear Rate of Composition of Phenolic Resin and Graphite Fluoride

| | Kind of Graphite Fluoride incorporated in the composition | Specific Wear Rate (mm$^3$/km · kg) |
|---|---|---|
| Example 1 | partially defluorinated (CF)n | 1.84 |
| Example 2 | partially defluorinated (CF)n | 1.61 |
| Control | raw material | 2.60 |

TABLE 2-continued

Specific Wear Rate of Composition of Phenolic Resin and Graphite Fluoride

| | Kind of Graphite Fluoride incorporated in the composition | Specific Wear Rate (mm$^3$/km · kg) |
|---|---|---|
| Example 3 | (CF)n for Examples 1 & 2 partially defluorinated (C$_2$F)n | 1.08 |
| Control | raw material (C$_2$F)n for Example 3 | 1.56 |

What is claimed is:

1. A lubricant comprising a partially defluorinated graphite fluoride obtained by a process comprising dispersing a graphite fluoride in a dispersion medium to obtain a dispersion, exposing the dispersion to electromagnetic radiation to effect partial degradation of the graphite fluoride in the dispersion so that the fluorine atoms in the graphite fluoride are partially removed, and separating the resulting partially degraded graphite fluoride from the dispersion.

2. A lubricant according to claim 1, wherein the graphite fluoride is a member selected from the group consisting of poly-monocarbon monofluoride, poly-dicarbon monofluoride and mixtures thereof.

3. A lubricant according to claim 1, wherein the exposure of the dispersion is conducted to such an extent that the graphite fluoride in the dispersion exhibits a degree of degradation of from 0.01 to 50%, said degree of degradation being defined by $$\frac{X_1 - X_2}{X_1} \times 100 \, (\%)$$

in which $X_1$ represents the amount of fluorine atoms contained in the graphite fluoride before the exposure and $X_2$ represents the amount of fluorine atoms contained in the graphite fluoride after the exposure.

4. A lubricant according to claim 3, wherein the exposure of the dispersion is conducted to such an extent that the graphite fluoride in the dispersion exhibits a degree of degradation of from 0.1 to 10%.

5. A lubricant according to claim 1, wherein the graphite fluoride has a particle diameter of from 0.01 to 100 microns.

6. A lubricant according to claim 1, wherein the electromagnetic radiation has a wavelength of from $10^{-4}$ to $10^{-7}$.

7. A lubricant according to claim 1, wherein the dispersion medium is an organic solvent, a water containing a surface active agent, an alkaline aqueous solution or an alkaline gas.

8. A lubricant according to claim 7, wherein the organic solvent is ethanol or acetone.

9. A lubricant according to claim 7, wherein the alkaline aqueous solution is an aqueous solution of sodium hydroxide or potassium hydroxide.

10. A lubricant according to claim 7, wherein the alkaline gas is an ammonia gas.

11. A lubricant according to claim 1, which further comprises at least one member selected from the group consisting of a resin, an oil and a grease.

12. A lubricant according to claim 11, wherein the resin is a member selected from the group consisting of phenolic resins, polyimides, polyamides, polyethylene, polymethyl methacrylate and fluoropolymers.

13. A lubricant according to claim 11, wherein the oil is a petroleum oil selected from paraffinic oils and naphthenic oils or a non-petroleum oil selected from silicone oils and fluoro-oils.

14. A lubricant according to claim 11, wherein the grease is a mineral oil grease or a silicon grease.

* * * * *